(12) United States Patent  
Shimizu et al.

(10) Patent No.: US 7,460,354 B2  
(45) Date of Patent: Dec. 2, 2008

(54) LAMINATED CAPACITOR HAVING LAMINATED INTERNAL CONDUCTOR LAYERS WITH LEAD OUT PORTIONS ON SIDE AREAS THEREOF

(75) Inventors: Masayuki Shimizu, Gunma (JP); Iwao Fujikawa, Gunma (JP); Kazuyuki Shibuya, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 11/733,685

(22) Filed: Apr. 10, 2007

(65) Prior Publication Data

US 2007/0247783 A1  Oct. 25, 2007

(30) Foreign Application Priority Data

Apr. 11, 2006 (JP) .............................. 2006-108816

(51) Int. Cl.  
*H01G 4/005* (2006.01)  
*H01G 4/228* (2006.01)

(52) U.S. Cl. ................. 361/303; 361/306.2; 361/306.3; 361/309

(58) Field of Classification Search ................. 361/303, 361/321.2, 301.1, 301.4, 306.1, 306.2, 306.3, 361/308.1, 309  
See application file for complete search history.

(56) References Cited

FOREIGN PATENT DOCUMENTS

JP       2002-508114       3/2002  
JP       2002-151349       5/2002

*Primary Examiner*—Eric Thomas  
*Assistant Examiner*—David M Sinclair  
(74) *Attorney, Agent, or Firm*—Knobbe Martens Olson & Bear LLP

(57) ABSTRACT

One inventive aspect relates to a laminated capacitor capable of satisfying higher electrostatic capacitance and lower ESL at the same time. A dielectric chip constituting the laminated capacitor has an integral structure formed by alternately laminating a pair of first inner conductor layer and second inner conductor layer which are positioned on the same plane and are held in a non-contact relation, and a pair of third inner conductor layer and fourth inner conductor layer which are positioned on the same plane and are held in a non-contact relation, while a dielectric layer is interposed between the pair of first and second inner conductor layers and the pair of third and fourth inner conductor layers. Voltage of one polarity is applied to the first and fourth inner conductor layers from a first outer electrode through lead-out portions, and voltage of the other polarity is applied to the second and third inner conductor layers from a second outer electrode through lead-out portions.

4 Claims, 9 Drawing Sheets

LAMINATED CAPACITOR HAVING LAMINATED INTERNAL CONDUCTOR LAYERS WITH LEAD OUT PORTIONS ON SIDE AREAS THEREOF

BACKGROUND OF THE INVENTION

1. Field of the Invention

The present invention relates to a laminated capacitor suitably used for decoupling.

2. Description of the Related Technology

A laminated capacitor used for decoupling is required to have high electrostatic capacitance and low ESL (Equivalent Series Inductance). PCT Japanese Translation Patent Publication No. 2002-508114 and Japanese Unexamined Patent Application Publication No. 2002-151349 disclose laminated capacitors of that type.

The laminated capacitor disclosed in PCT Japanese Translation Patent Publication No. 2002-508114 comprises a parallelepiped dielectric chip and a total of eight outer electrodes arranged such that four outer electrodes are disposed on each of opposite side surfaces of the dielectric chip in the direction of width thereof and are alternately supplied with different polarities. The dielectric chip has an integral structure formed by alternately laminating a first inner conductor layer having a total of four outer electrode-adapted lead-out portions which are disposed in units of two at each of opposite side edges of the first inner conductor layer in the direction of width thereof and a second inner conductor layer having a total of four outer electrode-adapted lead-out portions which are disposed in units of two at each of opposite side edges of the second inner conductor layer in the direction of width thereof and which are arranged at different positions from the lead-out portions of the first inner conductor layer, while a dielectric layer is interposed between the first and second inner conductor layers. The four lead-out portions of each first inner conductor layer are connected to the four outer electrodes which are supplied with one polarity, and the four lead-out portions of each second inner conductor layer are connected to the remaining four outer electrodes which are supplied with the other polarity. A laminated capacitor disclosed in Japanese Unexamined Patent Application Publication No. 2002-151349 has such a structure that each first inner conductor layer of the laminated capacitor disclosed in PCT Japanese Translation Patent Publication No. 2002-508114 is divided into two in the direction of width thereof and each second inner conductor layer is also divided into two in the direction of width thereof.

In the laminated capacitor disclosed in PCT Japanese Translation Patent Publication No. 2002-508114, currents flowing through the lead-out portions at different polarities, which are adjacent to each other with the dielectric layer interposed therebetween, are directed opposed to each other so as to cancel magnetic fields generated by the currents flowing through the lead-out portions, whereby the ESL can be reduced. Also, the first inner conductor layer and the second inner conductor layer laminated with the dielectric layer interposed therebetween can provide sufficient electrostatic capacitance suitably used for decoupling.

On the other hand, in the laminated capacitor disclosed in Japanese Unexamined Patent Application Publication No. 2002-151349, currents flowing through divided two of the first inner conductor layer and currents flowing through divided two of the second inner conductor layer are directed opposed to each other per layer and between the layers so as to cancel magnetic fields generated by the currents flowing through the inner conductor layers. Therefore, the ESL can be further reduced in comparison with the laminated capacitor disclosed in PCT Japanese Translation Patent Publication No. 2002-508114.

However, because the laminated capacitor disclosed in Japanese Unexamined Patent Application Publication No. 2002-151349 has the structure that each first inner conductor layer of the laminated capacitor disclosed in PCT Japanese Translation Patent Publication No. 2002-508114 is divided into two in the direction of width thereof and each second inner conductor layer is also divided into two in the direction of width thereof, the electrostatic capacitance of the laminated capacitor disclosed in Japanese Unexamined Patent Application Publication No. 2002-151349 is smaller than that of the laminated capacitor disclosed in PCT Japanese Translation Patent Publication No. 2002-508114 for the reason that an area of the inner conductor layers opposed to each other with the dielectric layer interposed therebetween is reduced in the former. Stated another way, the laminated capacitor disclosed in Japanese Unexamined Patent Application Publication No. 2002-151349 is superior to the laminated capacitor disclosed in PCT Japanese Translation Patent Publication No. 2002-508114 in point of realizing lower ESL, but it is inferior to the laminated capacitor disclosed in PCT Japanese Translation Patent Publication No. 2002-508114 in point of realizing higher electrostatic capacitance.

SUMMARY OF CERTAIN INVENTIVE ASPECTS

An object of certain inventive aspects is to provide a laminated capacitor capable of satisfying higher electrostatic capacitance and lower ESL at the same time.

To achieve the above object, one inventive aspect provides a laminated capacitor comprising a parallelepiped dielectric chip, and eight or more outer electrodes disposed on opposite side surfaces of the dielectric chip and alternately supplied with different polarities, wherein the dielectric chip has an integral structure formed by alternately laminating a pair of first inner conductor layer and second inner conductor layer which are positioned on the same plane and are held in a non-contact relation, and a pair of third inner conductor layer and fourth inner conductor layer which are positioned on the same plane and are held in a non-contact relation, while a dielectric layer is interposed between the pair of first and second inner conductor layers and the pair of third and fourth inner conductor layers. The first inner conductor layer and the third inner conductor layer are positioned to face each other with the dielectric layer interposed therebetween, and the second inner conductor layer and the fourth inner conductor layer are positioned to face each other with the dielectric layer interposed therebetween. The first inner conductor layer has at least two outer electrode-adapted lead-out portions which are disposed at side edges thereof and are connected respectively to the outer electrodes supplied with one polarity, the second inner conductor layer has at least two outer electrode-adapted lead-out portions which are disposed at side edges thereof and are connected respectively to the outer electrodes supplied with the other polarity, the third inner conductor layer has at least two outer electrode-adapted lead-out portions which are disposed at side edges thereof and are connected respectively to the outer electrodes supplied with the other polarity, and the fourth inner conductor layer has at least two outer electrode-adapted lead-out portions which are disposed at side edges thereof and are connected respectively to the outer electrodes supplied with one polarity.

With the laminated capacitor having the above features, in a state of alternately applying different polarities to the eight or more outer electrodes, the ESL (Equivalent Series Inductance) of the laminated capacitor can be effectively reduced based on the following actions, i.e., (1) a magnetic field canceling action (magnetic flux counteracting action) due to currents flowing in opposed directions respectively through the lead-out portions of the first inner conductor layer and the lead-out portions of the second inner conductor layer which is positioned on the same plane as the first inner conductor layer and which differs in polarity from it, and a magnetic field canceling action (magnetic flux counteracting action) due to currents flowing in opposed directions respectively through the first inner conductor layer and the second inner conductor layer, (2) a magnetic field canceling action (magnetic flux counteracting action) due to currents flowing in opposed directions respectively through the lead-out portions of the third inner conductor layer and the lead-out portions of the fourth inner conductor layer which is positioned on the same plane as the third inner conductor layer and which differs in polarity from it, and a magnetic field canceling action (magnetic flux counteracting action) due to currents flowing in opposed directions respectively through the third inner conductor layer and the fourth inner conductor layer, (3) a magnetic field canceling action (magnetic flux counteracting action) due to currents flowing in opposed directions respectively through the lead-out portions of the first inner conductor layer and the lead-out portions of the third inner conductor layer which is positioned to face the first inner conductor layer with the dielectric layer interposed between them and which differs in polarity from it, and a magnetic field canceling action (magnetic flux counteracting action) due to currents flowing in opposed directions respectively through the first inner conductor layer and the third inner conductor layer, and (4) a magnetic field canceling action (magnetic flux counteracting action) due to currents flowing in opposed directions respectively through the lead-out portions of the second inner conductor layer and the lead-out portions of the fourth inner conductor layer which is positioned to face the second inner conductor layer with the dielectric layer interposed between them and which differs in polarity from it, and a magnetic field canceling action (magnetic flux counteracting action) due to currents flowing in opposed directions respectively through the second inner conductor layer and the fourth inner conductor layer.

Further, predetermined electrostatic capacitance can be formed by the first inner conductor layer and the third inner conductor layer which is positioned to face the first inner conductor layer with the dielectric layer interposed between them, and the predetermined electrostatic capacitance can be formed by the second inner conductor layer and the fourth inner conductor layer which is positioned to face the second inner conductor layer with the dielectric layer interposed between them. Also, predetermined electrostatic capacitance can be formed between the first inner conductor layer and the second inner conductor layer which are positioned on the same plane and have different polarities, and predetermined electrostatic capacitance can be formed between the third inner conductor layer and the fourth inner conductor layer which are positioned on the same plane and have different polarities. Therefore, the electrostatic capacitance of the laminated capacitor obtained through the outer electrodes at one polarity and the outer electrodes at the other polarity can be given by a resultant value of four electrostatic capacitances. It is hence possible to compensate for a reduction of the electrostatic capacitance, which is caused if the first inner conductor layer and the second inner conductor layer are positioned on the same plane with application of the same polarity and the third inner conductor layer 114 and the fourth inner conductor layer are positioned on the same plane with application of the same polarity, by the presence of the last two electrostatic capacitances mentioned above, and to certainly provide the laminated capacitor with sufficient electrostatic capacitance suitably used for decoupling.

According to one inventive aspect, a laminated capacitor capable of satisfying higher electrostatic capacitance and lower ESL at the same time can be provided.

The above and other objects, constituent features, and operating advantages of the foregoing inventive aspects will be apparent from the following description and the accompanying drawings.

DESCRIPTION OF CERTAIN INVENTIVE EMBODIMENTS

Figure 1:
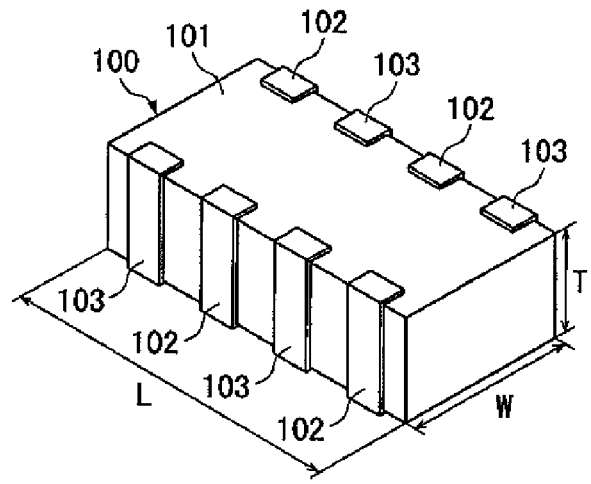
FIG. 1 is a perspective view of a laminated capacitor representing a first embodiment of the present invention.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed apparatus. However, it will be understood by one of ordinary skill in the technology that the disclosed systems may be practiced without these specific details.

FIGS. 1-5 show a first embodiment of the present invention (i.e., a laminated capacitor in one exemplary form).

A laminated capacitor 100 shown in FIG. 1 comprises a parallelepiped dielectric chip 101 having a predetermined length L, width W and height T, and a total of eight outer electrodes 102 and 103 arranged such that four outer electrodes are disposed on each of opposite side surfaces of the dielectric chip 101 in the direction of width thereof at equal intervals. The total of eight outer electrodes 102 and 103 are alternately supplied with different polarities. Herein, the outer electrodes 102 supplied with one polarity are referred to as first outer electrodes 102, and the outer electrodes 103 supplied with the other polarity are referred to as second outer electrodes 103.

Figure 2:
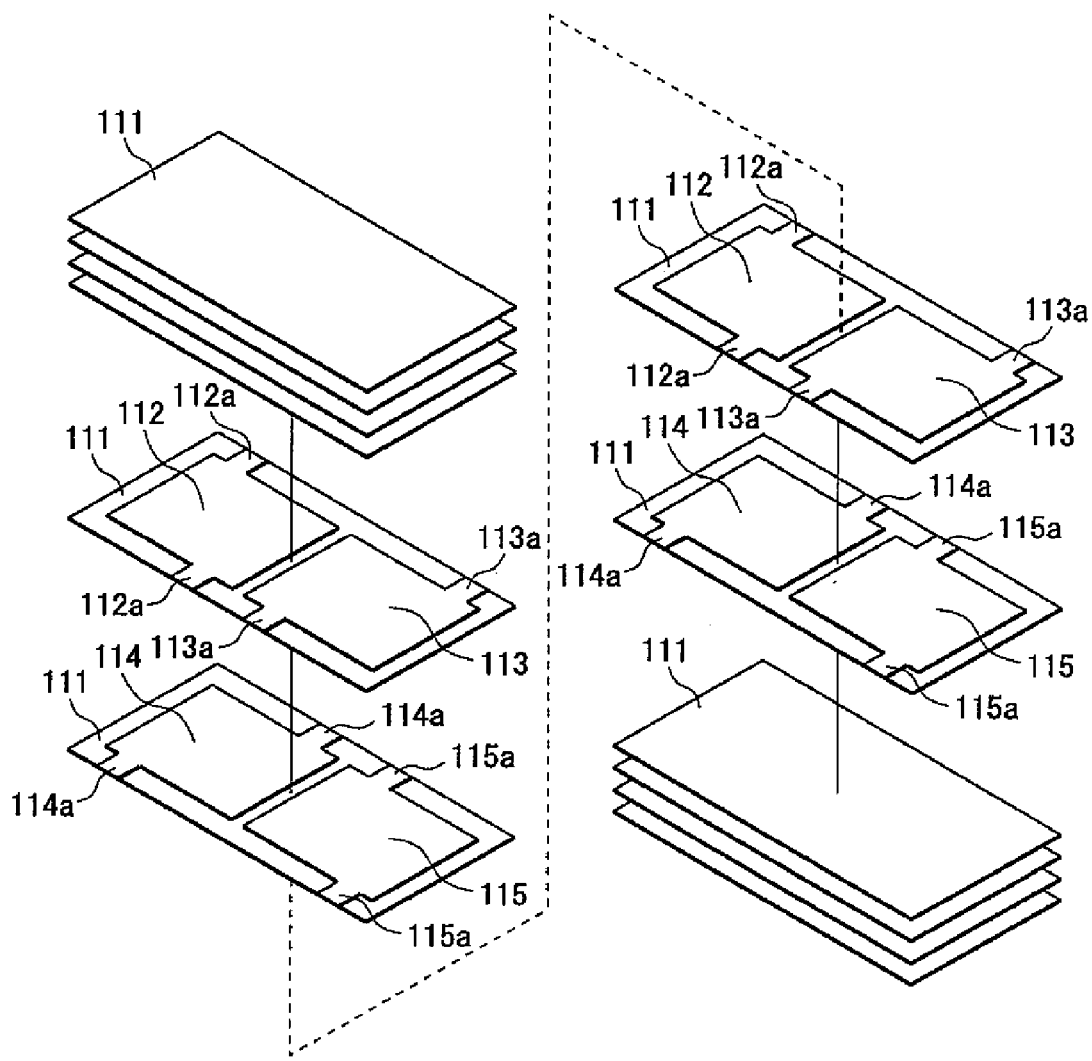
FIG. 2 is an exploded perspective view showing a layered structure of the laminated capacitor shown in FIG. 1.

As shown in FIG. 2, the dielectric chip 101 has an integral structure formed by alternately laminating, in the direction of height, a pair of first inner conductor layer 112 and second inner conductor layer 113 which are positioned on the same plane and are held in a non-contact relation with a strip-like clearance interposed between them, and a pair of third inner conductor layer 114 and fourth inner conductor layer 115 which are positioned on the same plane and are held in a non-contact relation with a strip-like clearance interposed between them, while a dielectric layer 111 is interposed between the pair of first and second inner conductor layers and the pair of third and fourth inner conductor layers. In other words, the first inner conductor layer 112 and the second inner conductor layer 113 are present in a non-contact state at a predetermined laminate layer interface of the dielectric chip 101, and the third inner conductor layer 114 and the fourth inner conductor layer 115 are present in a non-contact state at another predetermined laminate layer interface of the dielectric chip 101, the latter interface differing from the former interface for the first inner conductor layer 112 and the second inner conductor layer 113.

The first to fourth inner conductor layers 112-115 have basically the same shape except for their lead-out portions. The clearance between the first inner conductor layer 112 and the second inner conductor layer 113 is positioned in match with the clearance between the third inner conductor layer 114 and the fourth inner conductor layer 115 in the direction of height. Therefore, the first inner conductor layer 112 and the third inner conductor layer 114 face each other in the direction of height with the dielectric layer 111 interposed therebetween, and the second inner conductor layer 113 and the fourth inner conductor layer 115 face each other in the direction of height with the dielectric layer 111 interposed therebetween. In order to positively develop electrostatic capacitance C13 and electrostatic capacitance C14 described later, the clearance between the first inner conductor layer 112 and the second inner conductor layer 113 and the clearance between the third inner conductor layer 114 and the fourth inner conductor layer 115 are each preferably as small as possible.

The first inner conductor layer 112 and the second inner conductor layer 113 are not always required to be in the same number as the third inner conductor layer 114 and the fourth inner conductor layer 115. The number of the inner conductor layers in one pairs may be larger than the number of the inner conductor layers in the other pairs by one.

Further, at each of opposite sides of the dielectric chip 101 in the direction of height, there is a portion (margin portion) in which only the dielectric layers 111 are laminated. The margin portion is set to have a thickness of approximately 30-70 µm at least on the side facing a substrate when the dielectric chip 101 is mounted to the substrate.

Each first inner conductor layer 112 is formed in a rectangular shape. The first inner conductor layer 112 has an outer electrode-adapted lead-out portion 112a at one side edge (right side in FIG. 2) thereof in the direction of width on one side (left side in FIG. 2) thereof in the direction of length, which corresponds to the first outer electrode 102 located at a leftmost position on one side surface (right side in FIG. 1) of the dielectric chip 101 in the direction of width and which is connected to the relevant first outer electrode 102, and also has an outer electrode-adapted lead-out portion 112a at the other side edge (left side in FIG. 2) thereof in the direction of width on the other side (right side in FIG. 2) thereof in the direction of length, which corresponds to the first outer electrode 102 located at a second leftmost position on the other side surface (left side in FIG. 1) of the dielectric chip 101 in the direction of width and which is connected to the relevant first outer electrode 102. In other words, each first inner conductor layer 112 is supplied with the same polarity as that of the first outer electrodes 102 through the two lead-out portions 112a.

Each second inner conductor layer 113 is formed in a rectangular shape. The second inner conductor layer 113 has an outer electrode-adapted lead-out portion 113a at one side edge (right side in FIG. 2) thereof in the direction of width on the other side (right side in FIG. 2) thereof in the direction of length, which corresponds to the second outer electrode 103 located at a rightmost position on the one side surface (right side in FIG. 1) of the dielectric chip 101 in the direction of width and which is connected to the relevant second outer electrode 103, and also has an outer electrode-adapted lead-out portion 113a at the other side edge (left side in FIG. 2) thereof in the direction of width on one side (left side in FIG. 2) thereof in the direction of length, which corresponds to the second outer electrode 103 located at a second rightmost position on the other side surface (left side in FIG. 1) of the dielectric chip 101 in the direction of width and which is connected to the relevant second outer electrode 103. In other words, each second inner conductor layer 113 is supplied with the same polarity as that of the second outer electrodes 103 through the two lead-out portions 113a.

Each third inner conductor layer 114 is formed in a rectangular shape. The third inner conductor layer 114 has an outer electrode-adapted lead-out portion 114a at one side edge (right side in FIG. 2) thereof in the direction of width on the other side (right side in FIG. 2) thereof in the direction of length, which corresponds to the second outer electrode 103 located at a second leftmost position on the one side surface (right side in FIG. 1) of the dielectric chip 101 in the direction of width and which is connected to the relevant second outer electrode 103, and also has an outer electrode-adapted lead-out portion 114a at the other side edge (left side in FIG. 2) thereof in the direction of width on one side (left side in FIG. 2) thereof in the direction of length, which corresponds to the second outer electrode 103 located at a leftmost position on the other side surface (left side in FIG. 1) of the dielectric chip 101 in the direction of width and which is connected to the relevant second outer electrode 103. In other words, each third inner conductor layer 114 is supplied with the same polarity as that of the second outer electrodes 103 through the two lead-out portions 114a.

Each fourth inner conductor layer 115 is formed in a rectangular shape. The fourth inner conductor layer 115 has an outer electrode-adapted lead-out portion 115a at one side edge (right side in FIG. 2) thereof in the direction of width on one side (left side in FIG. 2) thereof in the direction of length, which corresponds to the first outer electrode 102 located at a second rightmost position on the one side surface (right side in FIG. 1) of the dielectric chip 101 in the direction of width and which is connected to the relevant first outer electrode 102, and also has an outer electrode-adapted lead-out portion 115a at the other side edge (left side in FIG. 2) thereof in the direction of width on the other side (right side in FIG. 2) thereof in the direction of length, which corresponds to the first outer electrode 102 located at a rightmost position on the other side surface (left side in FIG. 1) of the dielectric chip 101 in the direction of width and which is connected to the relevant first outer electrode 102. In other words, each fourth inner conductor layer 115 is supplied with the same polarity as that of the first outer electrodes 102 through the two lead-out portions 115a.

Figure 3:
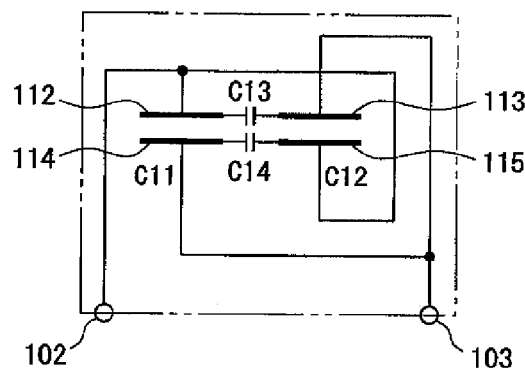
FIG. 3 is a diagram showing an equivalent circuit of the laminated capacitor shown in FIG. 1.

As seen from an equivalent circuit of FIG. 3, in the laminated capacitor 100 shown in FIG. 1, predetermined electrostatic capacitance C11 is formed by the first inner conductor layer 112 and the third inner conductor layer 114 which is positioned to face the first inner conductor layer 112 with the dielectric layer 111 interposed between them, and predetermined electrostatic capacitance C12 is formed by the second inner conductor layer 113 and the fourth inner conductor layer 115 which is positioned to face the second inner conductor layer 113 with the dielectric layer 111 interposed between them. Also, predetermined electrostatic capacitance C13 is formed between the first inner conductor layer 112 and the second inner conductor layer 113 which are positioned on the same plane and have different polarities, and predetermined electrostatic capacitance C14 is formed between the third inner conductor layer 114 and the fourth inner conductor layer 115 which are positioned on the same plane and have different polarities. Accordingly, electrostatic capacitance of the laminated capacitor 100 obtained through the four first outer electrodes 102 and the four second outer electrodes 103 is given by a resultant value of the electrostatic capacitance C11, the electrostatic capacitance C12, the electrostatic capacitance C13, and the electrostatic capacitance C14, which are connected in parallel.

The laminated capacitor 100 shown in FIG. 1 is used in a state where one polarity is applied to the four first outer electrodes 102 and the other polarity is applied to the four second outer electrode 103.

Figure 4:
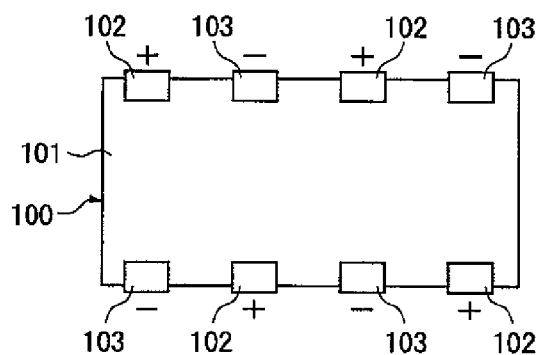
FIG. 4 is a diagram showing polarities when four first outer electrodes of the laminated capacitor shown in FIG. 1 are set to be plus and four second outer electrodes thereof are set to be minus (grounded)
Figure 5:
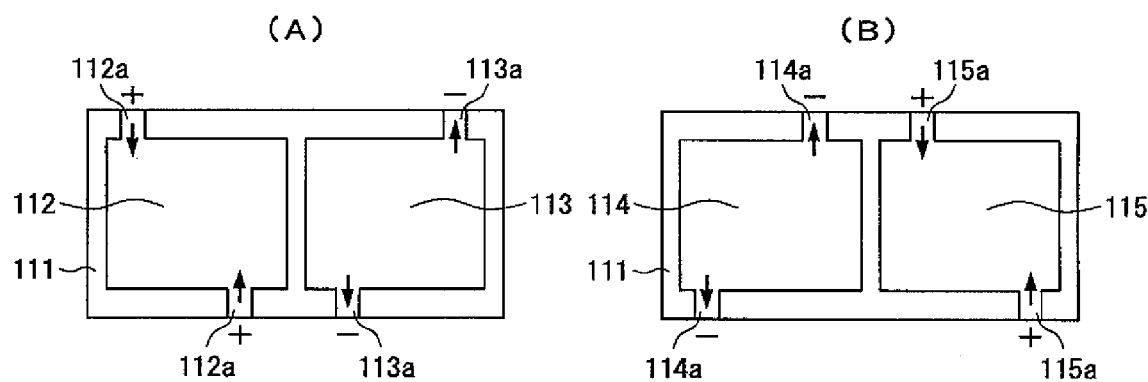
FIGS. 5A and 5B are diagrams showing directions of current flows in first to fourth inner conductor layers when the four first outer electrodes of the laminated capacitor shown in FIG. 1 are set to be plus and the four second outer electrodes thereof are set to be minus (grounded)

For example, when the four first outer electrodes 102 are set to be plus (e.g., positive) and the four second outer electrodes 103 are set to be minus (e.g. grounded) as shown in FIG. 4, currents flow in opposed directions respectively through the lead-out portions 112a of the first inner conductor layer 112 and the lead-out portions 113a of the second inner conductor layer 113 which is positioned on the same plane as the first inner conductor layer 112 and which differs in polarity from it, as indicated by arrows in FIG. 5A. Corresponding to those current flows, currents in opposed directions also flow respectively through the first inner conductor layer 112 and the second inner conductor layer 113. Further, as indicated by arrows in FIG. 5B, currents flow in opposed directions respectively through the lead-out portions 114a of the third inner conductor layer 114 and the lead-out portions 115a of the fourth inner conductor layer 115 which is positioned on the same plane as the third inner conductor layer 114 and which differs in polarity from it. Corresponding to those current flows, currents in opposed directions also flow respectively through the third inner conductor layer 114 and the fourth inner conductor layer 115.

In addition, as indicated by the arrows in FIGS. 5A and 5B, currents flow in opposed directions respectively through the lead-out portions 112a of the first inner conductor layer 112 and the lead-out portions 114a of the third inner conductor layer 114 which is positioned to face the first inner conductor layer 112 with the dielectric layer 111 interposed between them and which differs in polarity from it. Corresponding to those current flows, currents in opposed directions also flow respectively through the first inner conductor layer 112 and the third inner conductor layer 114. Further, as indicated by the arrows in FIGS. 5A and 5B, currents flow in opposed directions respectively through the lead-out portions 113a of the second inner conductor layer 113 and the lead-out portions 115a of the fourth inner conductor layer 115 which is positioned to face the second inner conductor layer 113 with the dielectric layer 111 interposed between them and which differs in polarity from it. Corresponding to those current flows, currents in opposed directions also flow respectively through the second inner conductor layer 113 and the fourth inner conductor layer 115.

As a matter of course, when the four first outer electrodes 102 are set to be minus (grounded) and the four second outer electrodes 103 are set to be plus, the directions of currents flowing through the respective lead-out portions of the inner conductor layers and the inner conductor layers themselves are reversed from the above-described directions.

Thus, because the above-described current flows are obtained in the state where one polarity is applied to the four first outer electrodes 102 and the other polarity is applied to the four second outer electrode 103, the ESL (Equivalent Series Inductance) of the laminated capacitor 100 can be effectively reduced based on the following actions:

(1) A magnetic field canceling action (magnetic flux counteracting action) due to currents flowing in opposed directions respectively through the lead-out portions 112a of the first inner conductor layer 112 and the lead-out portions 113a of the second inner conductor layer 113 which is positioned on the same plane as the first inner conductor layer 112 and which differs in polarity from it, and a magnetic field canceling action (magnetic flux counteracting action) due to currents flowing in opposed directions respectively through the first inner conductor layer 112 and the second inner conductor layer 113;

(2) A magnetic field canceling action (magnetic flux counteracting action) due to currents flowing in opposed directions respectively through the lead-out portions 114a of the third inner conductor layer 114 and the lead-out portions 115a of the fourth inner conductor layer 115 which is positioned on the same plane as the third inner conductor layer 114 and which differs in polarity from it, and a magnetic field canceling action (magnetic flux counteracting action) due to currents flowing in opposed directions respectively through the third inner conductor layer 114 and the fourth inner conductor layer 115;

(3) A magnetic field canceling action (magnetic flux counteracting action) due to currents flowing in opposed directions respectively through the lead-out portions 112a of the first inner conductor layer 112 and the lead-out portions 114a of the third inner conductor layer 114 which is positioned to face the first inner conductor layer 112 with the dielectric layer 111 interposed between them and which differs in polarity from it, and a magnetic field canceling action (magnetic flux counteracting action) due to currents flowing in opposed directions respectively through the first inner conductor layer 112 and the third inner conductor layer 114; and (4) A magnetic field canceling action (magnetic flux counteracting action) due to currents flowing in opposed directions respectively through the lead-out portions 113a of the second inner conductor layer 113 and the lead-out portions 115a of the fourth inner conductor layer 115 which is positioned to face the second inner conductor layer 113 with the dielectric layer 111 interposed between them and which differs in polarity from it, and a magnetic field canceling action (magnetic flux counteracting action) due to currents flowing in opposed directions respectively through the second inner conductor layer 113 and the fourth inner conductor layer 115.

In particular, the magnetic field canceling actions (magnetic flux counteracting actions) of above (1) and (2) can be reliably and properly obtained by positioning, on the same plane, the first inner conductor layer 112 and the second inner conductor layer 113 which differ in polarity from each other, and by positioning, on the same plane, the third inner conductor layer 114 and the fourth inner conductor layer 115 which differ in polarity from each other.

Further, the predetermined electrostatic capacitance C11 can be formed by the first inner conductor layer 112 and the third inner conductor layer 114 which is positioned to face the first inner conductor layer 112 with the dielectric layer 111 interposed between them, and the predetermined electrostatic capacitance C12 can be formed by the second inner conductor layer 113 and the fourth inner conductor layer 115 which is positioned to face the second inner conductor layer 113 with the dielectric layer 111 interposed between them. Also, the predetermined electrostatic capacitance C13 can be formed between the first inner conductor layer 112 and the second inner conductor layer 113 which are positioned on the same plane and have different polarities, and the predetermined electrostatic capacitance C14 can be formed between the third inner conductor layer 114 and the fourth inner conductor layer 115 which are positioned on the same plane and have different polarities. Therefore, the electrostatic capacitance of the laminated capacitor 100 obtained through the four first outer electrodes 102 and the four second outer electrodes 103 can be given by the resultant value of four electrostatic capacitances, i.e., the electrostatic capacitance C11, the electrostatic capacitance C12, the electrostatic capacitance C13, and the electrostatic capacitance C14, which are connected in parallel. It is hence possible to compensate for a reduction of the electrostatic capacitance, which is caused if the first inner conductor layer 112 and the second inner conductor layer 113 are positioned on the same plane with application of the same polarity and the third inner conductor layer 114 and the fourth inner conductor layer 115 are positioned on the same plane with application of the same polarity, by the presence of the electrostatic capacitance C13 and the electrostatic capacitance C14, and to certainly provide the laminated capacitor 100 with sufficient electrostatic capacitance suitably used for decoupling.

Moreover, since the margin portion of the dielectric chip 101 is set to have a thickness of approximately 30-70 μm at least on the side facing the substrate when the dielectric chip 101 is mounted to the substrate, respective paths extending from the lead-out portions of the inner conductor layers to corresponding substrate electrodes through the outer electrodes are minimized and inductances caused by those paths are also reduced to a minimum, thus resulting in lower ESL. If the thickness of the margin portion is set to be smaller than 30 μm, there arises a risk that the strength of the margin portion is reduced and cracks, etc. may occur. If the thickness of the margin portion is set to be larger than 70 μm, the above-described action of reducing the inductance is difficult to obtain.

As an example, concrete numerical values of the ESL and the electrostatic capacitance will be described below when the laminated capacitor 100 is constituted as the so-called 1608 type (standard values of the length L and the width W shown in FIG. 1 are respectively 1.60 mm and 0.80 mm) and as the so-called 2125 type (standard values of the length L and the width W shown in FIG. 1 are respectively 2.00 mm and 1.25 mm).

Figure 6:
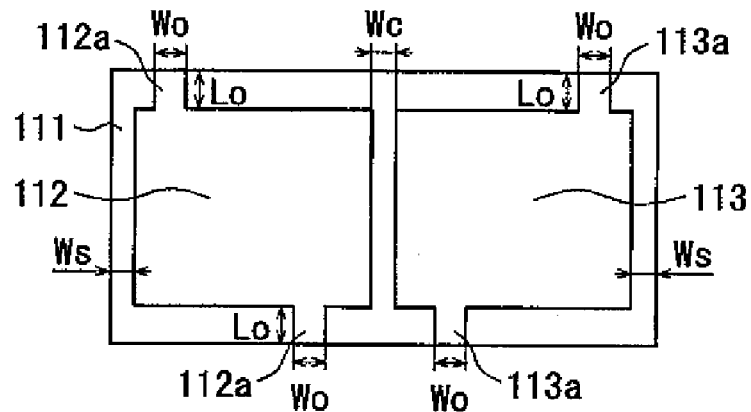
FIGS. 6A and 6B are explanatory views for explaining concrete numerical values of ESL and electrostatic capacitance of the laminated capacitor shown in FIG. 1.

In the case of the 1608 type, assuming that the dielectric constant $\in$ of the dielectric layer 111 is 3000-4000, the thickness of the dielectric layer 111 is 2.0-2.5 μm, the thickness of each of the first to fourth inner conductor layers 112-115 is 0.8-1.2 μm, the number of layers for each of the laminated first to fourth inner conductor layers 112-115 is 100-150, the thickness of the margin portion at each of the opposite sides of the dielectric chip 101 in the direction of height is 30-70 μm, the width Wo (see FIGS. 6A and 6B) of each of the lead-out portions 112a-115a of the first to fourth inner conductor layers 112-115 is 0.10-0.15 mm, the length Lo (see FIGS. 6A and 6B) of each of the lead-out portions 112a-115a of the first to fourth inner conductor layers 112-115 is 0.10-0.15 mm, the clearance Wc (see FIGS. 6A and 6B) between the first inner conductor layer 112 and the second inner conductor layer 113 and the clearance We between the third inner conductor layer 114 and the fourth inner conductor layer 115 are each 0.10-0.15 mm, and the width Ws (see FIGS. 6A and 6B) of the margin portion at each of the opposite sides of the dielectric chip 101 in the direction of length is 0.10-0.15 mm, the ESL can be reduced to 40-60 pH and the electrostatic capacitance of 1.0-2.2 μF can be ensured.

In the case of the 2125 type, assuming that the dielectric constant $\in$ of the dielectric layer 111 is 3000-4000, the thickness of the dielectric layer 111 is 3.0-4.0 μm, the thickness of each of the first to fourth inner conductor layers 112-115 is 0.8-1.2 μm, the number of layers for each of the laminated first to fourth inner conductor layers 112-115 is 100-200, the thickness of the margin portion at each of the opposite sides of the dielectric chip 101 in the direction of height is 30-70 μm, the width Wo (see FIGS. 6A and 6B) of each of the lead-out portions 112a-115a of the first to fourth inner conductor layers 112-115 is 0.10-0.15 mm, the length Lo (see FIGS. 6A and 6B) of each of the lead-out portions 112a-115a of the first to fourth inner conductor layers 112-115 is 0.10-0.15 mm, the clearance Wc (see FIGS. 6A and 6B) between the first inner conductor layer 112 and the second inner conductor layer 113 and the clearance We between the third inner conductor layer 114 and the fourth inner conductor layer 115 are each 0.10-0.15 mm, and the width Ws (see FIGS. 6A and 6B) of the margin portion at each of the opposite sides of the dielectric chip 101 in the direction of length is 0.15-0.20 mm, the ESL can be reduced to 80-120 pH and the electrostatic capacitance of 2.2-4.7 µF can be ensured.

In addition, by setting the width Wo of each of the lead-out portions 112a-115a of the first to fourth inner conductor layers 112-115 to be not smaller than the length Lo thereof, currents more easily flow through the first to fourth inner conductor layers 112-115, whereby the self-inductance of the laminated capacitor 100 can be reduced correspondingly. With a reduction of the self-inductance, the ESL of the laminated capacitor 100 can be further reduced.

FIGS. 7-11 show a second embodiment of the present invention (i.e., a laminated capacitor in another exemplary form).

Figure 7:
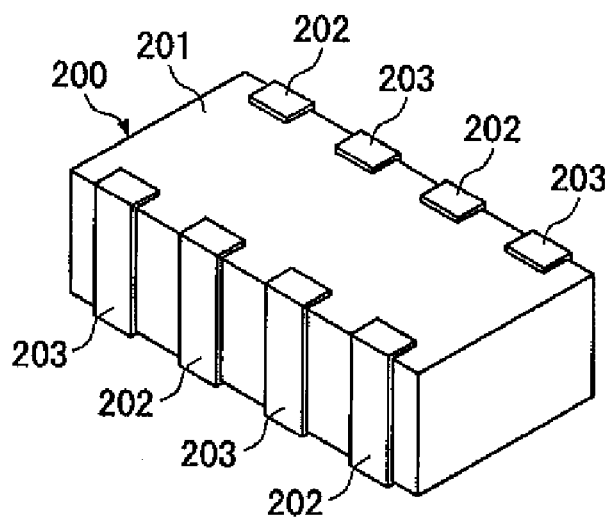
FIG. 7 is a perspective view of a laminated capacitor representing a second embodiment of the present invention.

A laminated capacitor 200 shown in FIG. 7 comprises a parallelepiped dielectric chip 201 having a predetermined length, width and height, and a total of eight outer electrodes 202 and 203 arranged such that four outer electrodes are disposed on each of opposite side surfaces of the dielectric chip 201 in the direction of width thereof at equal intervals. The total of eight outer electrodes 202 and 203 are alternately supplied with different polarities. Herein, the outer electrodes 202 supplied with one polarity are referred to as first outer electrodes 202, and the outer electrodes 203 supplied with the other polarity are referred to as second outer electrodes 203.

Figure 8:
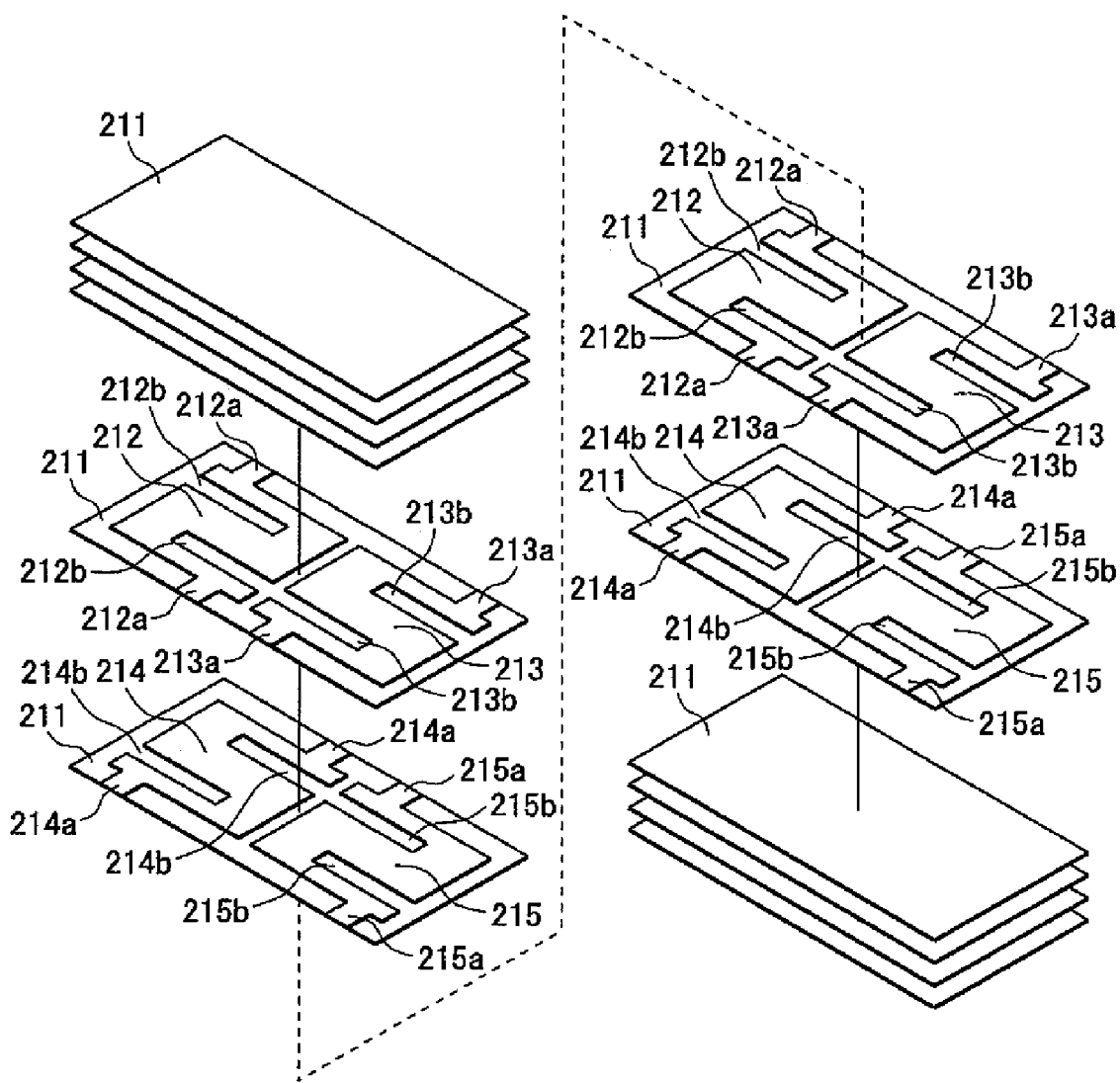
FIG. 8 is an exploded perspective view showing a layered structure of the laminated capacitor shown in FIG. 7.

As shown in FIG. 8, the dielectric chip 201 has an integral structure formed by alternately laminating, in the direction of height, a pair of first inner conductor layer 212 and second inner conductor layer 213 which are positioned on the same plane and are held in a non-contact relation with a strip-like clearance interposed between them, and a pair of third inner conductor layer 214 and fourth inner conductor layer 215 which are positioned on the same plane and are held in a non-contact relation with a strip-like clearance interposed between them, while a dielectric layer 211 is interposed between the pair of first and second inner conductor layers and the pair of third and fourth inner conductor layers. In other words, the first inner conductor layer 212 and the second inner conductor layer 213 are present in a non-contact state at a predetermined laminate layer interface of the dielectric chip 201, and the third inner conductor layer 214 and the fourth inner conductor layer 215 are present in a non-contact state at another predetermined laminate layer interface of the dielectric chip 201, the latter interface differing from the former interface for the first inner conductor layer 212 and the second inner conductor layer 213.

The first to fourth inner conductor layers 212-215 in the second embodiment are constituted such that respective two strip-like slits 212b-215b each having a predetermined length are formed in the first to fourth inner conductor layers 112-115 in the first embodiment to extend parallel in the direction of length.

More specifically, ones of the respective two slits 212b-215b formed in the inner conductor layers 212-215 are formed to have their openings positioned on the side close to ones of lead-out portions 212a-215b, and the others of the respective two slits 212b-215b are formed to have their openings positioned on the side close to the others of lead-out portions 212a-215b. Also, positions and orientations of the two slits 212b formed in the first inner conductor layer 212 and the two slits 213b formed in the second inner conductor layer 213 are line symmetry with respect to a center line of the clearance between the first and second inner conductor layers. Further, positions and orientations of the two slits 214b formed in the third inner conductor layer 214 and the two slits 215b formed in the fourth inner conductor layer 215 are line symmetry with respect to a center line of the clearance between the third and fourth inner conductor layers.

Note that since the remaining structures of the dielectric chip 201, the first to fourth inner conductor layers 212-215, and the outer electrode-adapted lead-out portion 212a-215a are similar to those of the corresponding ones in the first embodiment, a description thereof is omitted here.

Figure 9:
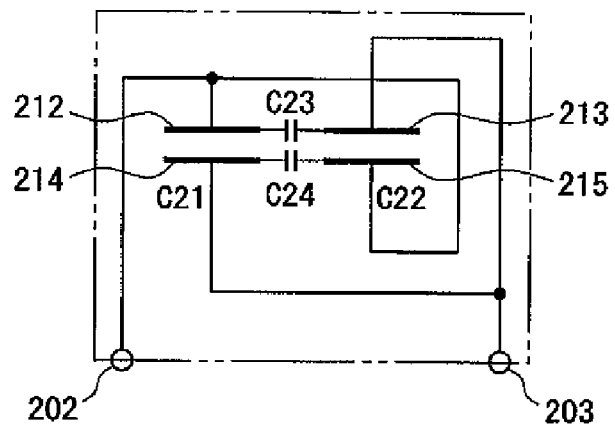
FIG. 9 is a diagram showing an equivalent circuit of the laminated capacitor shown in FIG. 7.

As seen from an equivalent circuit of FIG. 9, in the laminated capacitor 200 shown in FIG. 7, predetermined electrostatic capacitance C21 is formed by the first inner conductor layer 212 and the third inner conductor layer 214 which is positioned to face the first inner conductor layer 212 with the dielectric layer 211 interposed between them, and predetermined electrostatic capacitance C22 is formed by the second inner conductor layer 213 and the fourth inner conductor layer 215 which is positioned to face the second inner conductor layer 213 with the dielectric layer 211 interposed between them. Also, predetermined electrostatic capacitance C23 is formed between the first inner conductor layer 212 and the second inner conductor layer 213 which are positioned on the same plane and have different polarities, and predetermined electrostatic capacitance C24 is formed between the third inner conductor layer 214 and the fourth inner conductor layer 215 which are positioned on the same plane and have different polarities. Accordingly, electrostatic capacitance of the laminated capacitor 200 obtained through the four first outer electrodes 202 and the four second outer electrodes 203 is given by a resultant value of four electrostatic capacitances, i.e., the electrostatic capacitance C21, the electrostatic capacitance C22, the electrostatic capacitance C23, and the electrostatic capacitance C24, which are connected in parallel.

The laminated capacitor 200 shown in FIG. 7 is used in a state where one polarity is applied to the four first outer electrodes 202 and the other polarity is applied to the four second outer electrode 203.

Figure 10:
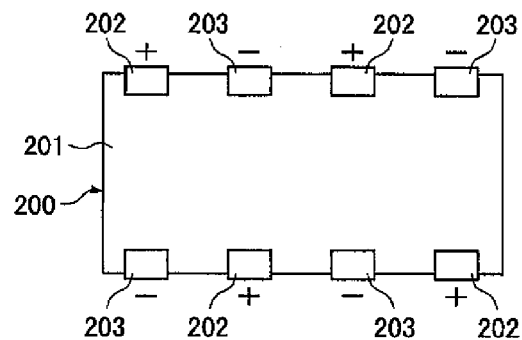
FIG. 10 is a diagram showing polarities when four first outer electrodes of the laminated capacitor shown in FIG. 7 are set to be plus and four second outer electrodes thereof are set to be minus (grounded)

For example, when the four first outer electrodes 202 are set to be plus and the four second outer electrodes 203 are set to be minus (grounded) as shown in FIG. 10, currents flow in opposed directions respectively through the lead-out portions 212a of the first inner conductor layer 212 and the lead-out portions 213a of the second inner conductor layer 213 which is positioned on the same plane as the first inner conductor layer 212 and which differs in polarity from it, as indicated by arrows in FIG. 11A. Corresponding to those current flows, currents in opposed directions also flow respectively through the first inner conductor layer 212 and the second inner conductor layer 213 along the slits 212b and 213b. Further, as indicated by arrows in FIG. 11B, currents flow in opposed directions respectively through the lead-out portions 214a of the third inner conductor layer 214 and the lead-out portions 215a of the fourth inner conductor layer 215 which is positioned on the same plane as the third inner conductor layer 214 and which differs in polarity from it. Corresponding to those current flows, currents in opposed directions also flow respectively through the third inner conductor layer 214 and the fourth inner conductor layer 215 along the slits 214b and 215b.

In addition, as indicated by the arrows in FIGS. 11A and 11B, currents flow in opposed directions respectively through the lead-out portions 212a of the first inner conductor layer 212 and the lead-out portions 214a of the third inner conductor layer 214 which is positioned to face the first inner conductor layer 212 with the dielectric layer 211 interposed between them and which differs in polarity from it. Corresponding to those current flows, currents in opposed directions also flow respectively through the first inner conductor layer 212 and the third inner conductor layer 214 along the slits 212b and 214b. Further, as indicated by the arrows in FIGS. 11A and 11B, currents flow in opposed directions respectively through the lead-out portions 213a of the second inner conductor layer 213 and the lead-out portions 215a of the fourth inner conductor layer 215 which is positioned to face the second inner conductor layer 213 with the dielectric layer 211 interposed between them and which differs in polarity from it. Corresponding to those current flows, currents in opposed directions also flow respectively through the second inner conductor layer 213 and the fourth inner conductor layer 215 along the slits 213b and 215b.

As a matter of course, when the four first outer electrodes 202 are set to be minus (grounded) and the four second outer electrodes 203 are set to be plus, the directions of currents flowing through the respective lead-out portions of the inner conductor layers and the inner conductor layers themselves are reversed from the above-described directions.

Thus, because the above-described current flows are obtained in the state where one polarity is applied to the four first outer electrodes 202 and the other polarity is applied to the four second outer electrode 203, the ESL (Equivalent Series Inductance) of the laminated capacitor 200 can be effectively reduced based on similar magnetic field canceling actions (magnetic flux counteracting actions) to those of above (1)-(4) described in the first embodiment.

In particular, the magnetic field canceling actions (magnetic flux counteracting actions) of above (1) and (2) can be reliably and properly obtained by positioning, on the same plane, the first inner conductor layer 212 and the second inner conductor layer 213 which differ in polarity from each other, and by positioning, on the same plane, the third inner conductor layer 214 and the fourth inner conductor layer 215 which differ in polarity from each other.

Further, the predetermined electrostatic capacitance C21 can be formed by the first inner conductor layer 212 and the third inner conductor layer 214 which is positioned to face the first inner conductor layer 212 with the dielectric layer 211 interposed between them, and the predetermined electrostatic capacitance C22 can be formed by the second inner conductor layer 213 and the fourth inner conductor layer 215 which is positioned to face the second inner conductor layer 213 with the dielectric layer 211 interposed between them. Also, the predetermined electrostatic capacitance C23 can be formed between the first inner conductor layer 212 and the second inner conductor layer 213 which are positioned on the same plane and have different polarities, and the predetermined electrostatic capacitance C24 can be formed between the third inner conductor layer 214 and the fourth inner conductor layer 215 which are positioned on the same plane and have different polarities. Therefore, the electrostatic capacitance of the laminated capacitor 200 obtained through the four first outer electrodes 202 and the four second outer electrodes 203 can be given by the resultant value of four electrostatic capacitances, i.e., the electrostatic capacitance C21, the electrostatic capacitance C22, the electrostatic capacitance C23, and the electrostatic capacitance C24, which are connected in parallel. It is hence possible to compensate for a reduction of the electrostatic capacitance, which is caused if the first inner conductor layer 212 and the second inner conductor layer 213 are positioned on the same plane with application of the same polarity and the third inner conductor layer 214 and the fourth inner conductor layer 215 are positioned on the same plane with application of the same polarity, by the presence of the electrostatic capacitance C23 and the electrostatic capacitance C24, and to certainly provide the laminated capacitor 200 with sufficient electrostatic capacitance suitably used for decoupling.

Moreover, since the margin portion of the dielectric chip 201 is set to have a thickness of 30-70 μm at least on the side facing a substrate when the dielectric chip 201 is mounted to the substrate, respective paths extending from the lead-out portions of the inner conductor layers to corresponding substrate electrodes through the outer electrodes are minimized and inductances caused by those paths are also reduced to a minimum, thus resulting in lower ESL. If the thickness of the margin portion is set to be smaller than 30 μm, there arises a risk that the strength of the margin portion is reduced and cracks, etc. may occur. If the thickness of the margin portion is set to be larger than 70 μm, the above-described action of reducing the inductance is difficult to obtain.

In addition, by setting the width of each of the lead-out portions 212a-215a of the first to fourth inner conductor layers 212-215 to be not smaller than the length thereof, currents more easily flow through the first to fourth inner conductor layers 212-215, whereby the self-inductance of the laminated capacitor 200 can be reduced correspondingly. With a reduction of the self-inductance, the ESL of the laminated capacitor 200 can be further reduced.

FIGS. 12-16 show a third embodiment of the present invention (i.e., a laminated capacitor in still another exemplary form).

Figure 11:
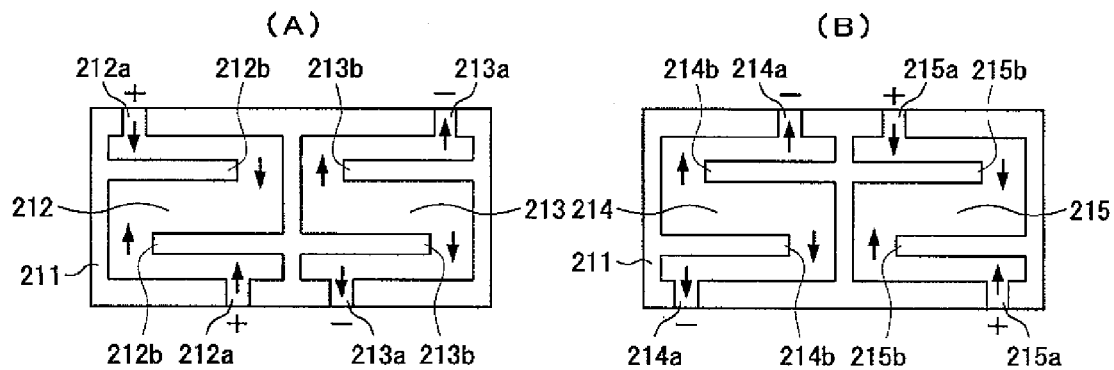
FIGS. 11A and 11B are diagrams showing directions of current flows in first to fourth inner conductor layers when the four first outer electrodes of the laminated capacitor shown in FIG. 7 are set to be plus and the four second outer electrodes thereof are set to be minus (grounded)

A laminated capacitor 300 shown in FIG. 11 comprises a parallelepiped dielectric chip 301 having a predetermined length, width and height, a total of eight outer electrodes 302 and 303 arranged such that four outer electrodes are disposed on each of opposite side surfaces of the dielectric chip 301 in the direction of width thereof at equal intervals, and a total of two outer electrodes 304 and 305 arranged such that one outer electrode is disposed on each of opposite side surfaces of the dielectric chip 301 in the direction of length thereof. The total of eight outer electrodes 302 and 303 are alternately supplied with different polarities. Herein, the outer electrodes 302 supplied with one polarity are referred to as first outer electrodes 302, and the outer electrodes 303 supplied with the other polarity are referred to as second outer electrodes 303. Also, the total of two outer electrodes 304 and 305 are alternately supplied with different polarities. Herein, the outer electrode 304 supplied with one polarity is referred to as a third outer electrode 304, and the outer electrode 305 supplied with the other polarity is referred to as a fourth outer electrode 305.

Figure 13:
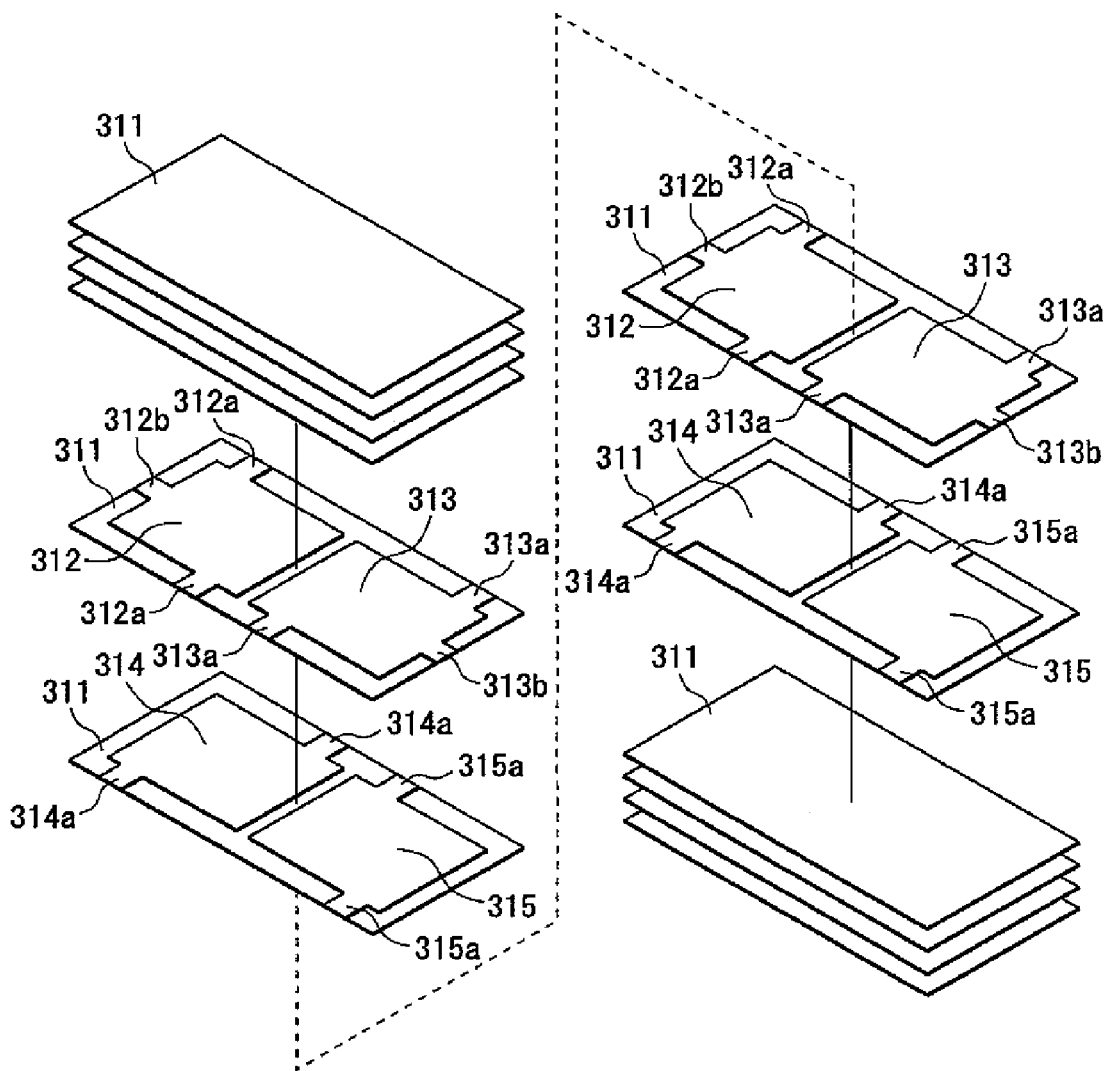
FIG. 13 is an exploded perspective view showing a layered structure of the laminated capacitor shown in FIG. 12.

As shown in FIG. 13, the dielectric chip 301 has an integral structure formed by alternately laminating, in the direction of height, a pair of first inner conductor layer 312 and second inner conductor layer 313 which are positioned on the same plane and are held in a non-contact relation with a strip-like clearance interposed between them, and a pair of third inner conductor layer 314 and fourth inner conductor layer 315 which are positioned on the same plane and are held in a non-contact relation with a strip-like clearance interposed between them, while a dielectric layer 311 is interposed between the pair of first and second inner conductor layers and the pair of third and fourth inner conductor layers. In other words, the first inner conductor layer 312 and the second inner conductor layer 313 are present in a non-contact state at a predetermined laminate layer interface of the dielectric chip 301, and the third inner conductor layer 314 and the fourth inner conductor layer 315 are present in a non-contact state at another predetermined laminate layer interface of the dielectric chip 301, the latter interface differing from the former interface for the first inner conductor layer 312 and the second inner conductor layer 313.

The first and second inner conductor layer 312, 313 in the third embodiment are constituted by adding third outer electrode-adapted lead-out portions 312b and 313b to the first and second inner conductor layers 112, 113 in the first embodiment, respectively.

More specifically, the first inner conductor layer 312 has the outer electrode-adapted lead-out portion 312b in a central area of one side edge (left side in FIG. 13) thereof in the direction of length, which corresponds to the third outer electrode 304 located on one side surface (left side in FIG. 12) of the dielectric chip 301 in the direction of length and which is connected to the relevant third outer electrode 304. The second inner conductor layer 313 has the outer electrode-adapted lead-out portion 313b in a central area of the other side edge (right side in FIG. 13) thereof in the direction of length, which corresponds to the fourth outer electrode 305 located on the other side surface (right side in FIG. 12) of the dielectric chip 301 in the direction of length and which is connected to the relevant fourth outer electrode 305.

Note that since the remaining structures of the dielectric chip 301, the first to fourth inner conductor layers 312-315, and the outer electrode-adapted lead-out portion 312a-315a are similar to those of the corresponding ones in the first embodiment, a description thereof is omitted here.

Figure 12:
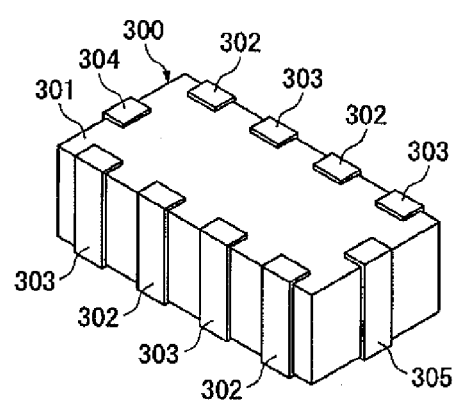
FIG. 12 is a perspective view of a laminated capacitor representing a third embodiment of the present invention.
Figure 14:
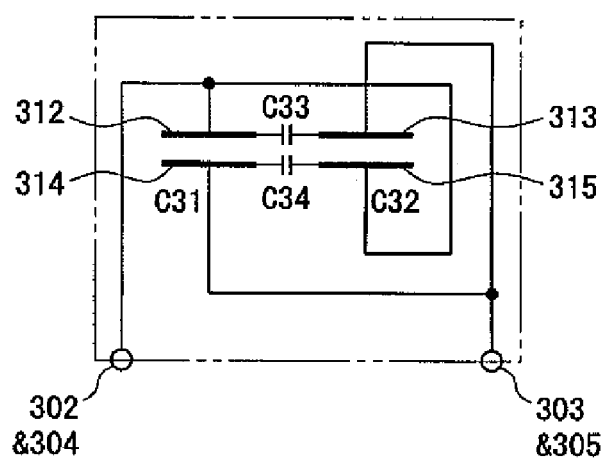
FIG. 14 is a diagram showing an equivalent circuit of the laminated capacitor shown in FIG. 12.

As seen from an equivalent circuit of FIG. 14, in the laminated capacitor 300 shown in FIG. 12, predetermined electrostatic capacitance C31 is formed by the first inner conductor layer 312 and the third inner conductor layer 314 which is positioned to face the first inner conductor layer 312 with the dielectric layer 311 interposed between them, and predetermined electrostatic capacitance C32 is formed by the second inner conductor layer 313 and the fourth inner conductor layer 315 which is positioned to face the second inner conductor layer 313 with the dielectric layer 311 interposed between them. Also, predetermined electrostatic capacitance C33 is formed between the first inner conductor layer 312 and the second inner conductor layer 313 which are positioned on the same plane and have different polarities, and predetermined electrostatic capacitance C34 is formed between the third inner conductor layer 314 and the fourth inner conductor layer 315 which are positioned on the same plane and have different polarities. Accordingly, electrostatic capacitance of the laminated capacitor 300 obtained through the four first outer electrodes 302, the one third outer electrode 304, the four second outer electrodes 303, and the one fourth outer electrode 305 is given by a resultant value of the electrostatic capacitance C31, the electrostatic capacitance C32, the electrostatic capacitance C33, and the electrostatic capacitance C34, which are connected in parallel.

The laminated capacitor 300 shown in FIG. 12 is used in a state where one polarity is applied to the four first outer electrodes 302 and the one third outer electrode 304, and the other polarity is applied to the four second outer electrode 303 and the one fourth outer electrode 305.

Figure 15:
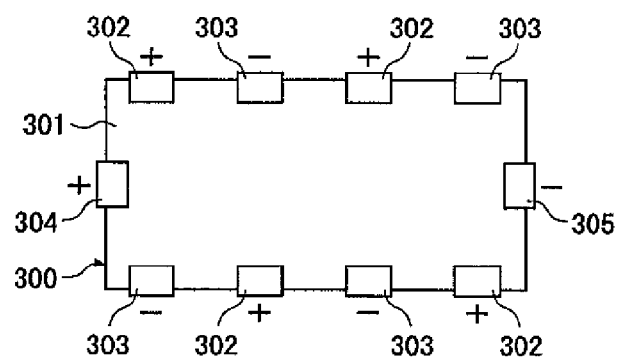
FIG. 15 is a diagram showing polarities when four first outer electrodes and one third outer electrode of the laminated capacitor shown in FIG. 12 are set to be positive (plus) and four second outer electrodes and one fourth outer electrode thereof are set to be negative (minus or grounded)
Figure 16:
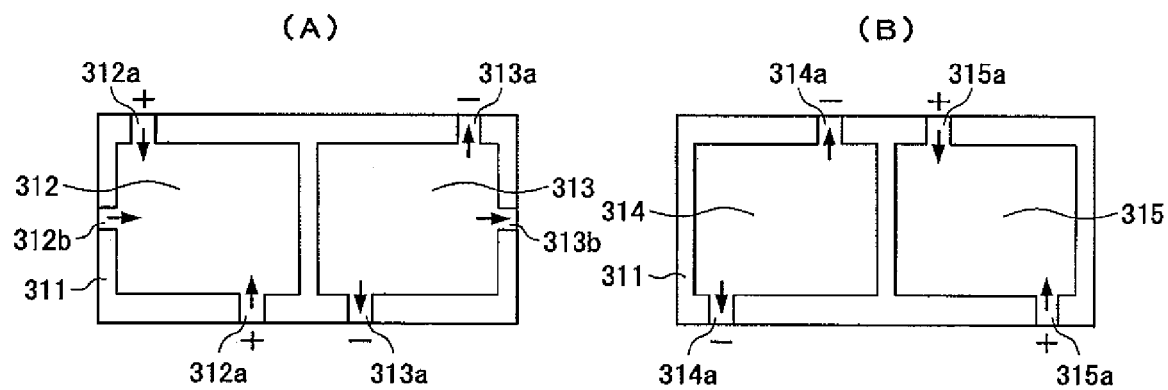
FIGS. 16A and 16B are diagrams showing directions of current flows in first to fourth inner conductor layers when the four first outer electrodes and the one third outer electrode of the laminated capacitor shown in FIG. 12 are set to be plus and the four second outer electrodes and the one fourth outer electrode thereof are set to be minus (grounded)

For example, when the four first outer electrodes 302 and the one third outer electrode 304 are set to be plus and the four second outer electrodes 303 and the one fourth outer electrode 305 are set to be minus (grounded) as shown in FIG. 15, currents flow in opposed directions respectively through the lead-out portions 312a of the first inner conductor layer 312 and the lead-out portions 313a of the second inner conductor layer 313 which is positioned on the same plane as the first inner conductor layer 312 and which differs in polarity from it, as indicated by arrows in FIG. 16A. Corresponding to those current flows, currents in opposed directions also flow respectively through the first inner conductor layer 312 and the second inner conductor layer 313. Further, as indicated by arrows in FIG. 16B, currents flow in opposed directions respectively through the lead-out portions 314a of the third inner conductor layer 314 and the lead-out portions 315a of the fourth inner conductor layer 315 which is positioned on the same plane as the third inner conductor layer 314 and which differs in polarity from it. Corresponding to those current flows, currents in opposed directions also flow respectively through the third inner conductor layer 314 and the fourth inner conductor layer 315.

In addition, as indicated by the arrows in FIGS. 16A and 16B, currents flow in opposed directions respectively through the lead-out portions 312a of the first inner conductor layer 312 and the lead-out portions 314a of the third inner conductor layer 314 which is positioned to face the first inner conductor layer 312 with the dielectric layer 311 interposed between them and which differs in polarity from it. Corresponding to those current flows, currents in opposed directions also flow respectively through the first inner conductor layer 312 and the third inner conductor layer 314. Further, as indicated by the arrows in FIGS. 16A and 16B, currents flow in opposed directions respectively through the lead-out portions 313a of the second inner conductor layer 313 and the lead-out portions 315a of the fourth inner conductor layer 315 which is positioned to face the second inner conductor layer 313 with the dielectric layer 311 interposed between them and which differs in polarity from it. Corresponding to those current flows, currents in opposed directions also flow respectively through the second inner conductor layer 313 and the fourth inner conductor layer 315.

Moreover, as indicated by the arrows in FIG. 16A, a current flows through the lead-out portion 312b of the first inner conductor layer 312 in a direction perpendicular to that of the current flowing through each of the lead-out portions 312a thereof. Also, a current flows through the lead-out portion 313b of the second inner conductor layer 313 in a direction perpendicular to that of the current flowing through each of the lead-out portions 313a thereof.

As a matter of course, when the four first outer electrodes 302 and the one third outer electrode 304 are set to be minus (grounded) and the four second outer electrodes 303 and the one fourth outer electrode 305 are set to be plus, the directions of currents flowing through the respective lead-out portions of the inner conductor layers and the inner conductor layers themselves are reversed from the above-described directions.

Thus, because the above-described current flows are obtained in the state where one polarity is applied to the four first outer electrodes 302 and the one third outer electrode 304 and the other polarity is applied to the four second outer electrode 303 and the one fourth outer electrode 305, the ESL (Equivalent Series Inductance) of the laminated capacitor 300 can be effectively reduced based on similar magnetic field canceling actions (magnetic flux counteracting actions) to those of above (1)-(4) described in the first embodiment.

In particular, the magnetic field canceling actions (magnetic flux counteracting actions) of above (1) and (2) can be reliably and properly obtained by positioning, on the same plane, the first inner conductor layer 312 and the second inner conductor layer 313 which differ in polarity from each other, and by positioning, on the same plane, the third inner conductor layer 314 and the fourth inner conductor layer 315 which differ in polarity from each other.

Also, as a result of increasing the number of the lead-out portions 312a and 312b of the first inner conductor layer 312 and the number of the lead-out portions 313a and 313b of the second inner conductor layer 313, currents more easily flow through the first inner conductor layer 312 and the second inner conductor layer 313, whereby the self-inductance of the laminated capacitor 300 can be reduced correspondingly. With a reduction of the self-inductance, the ESL of the laminated capacitor 300 can be further reduced.

Further, the predetermined electrostatic capacitance C31 can be formed by the first inner conductor layer 312 and the third inner conductor layer 314 which is positioned to face the first inner conductor layer 312 with the dielectric layer 311 interposed between them, and the predetermined electrostatic capacitance C32 can be formed by the second inner conductor layer 313 and the fourth inner conductor layer 315 which is positioned to face the second inner conductor layer 313 with the dielectric layer 311 interposed between them. Also, the predetermined electrostatic capacitance C33 can be formed between the first inner conductor layer 312 and the second inner conductor layer 313 which are positioned on the same plane and have different polarities, and the predetermined electrostatic capacitance C34 can be formed between the third inner conductor layer 314 and the fourth inner conductor layer 315 which are positioned on the same plane and have different polarities. Therefore, the electrostatic capacitance of the laminated capacitor 300 obtained through the four first outer electrodes 302, the one third outer electrode 304, the four second outer electrodes 303, and the one fourth outer electrode 305 can be given by the resultant value of four electrostatic capacitances, i.e., the electrostatic capacitance C31, the electrostatic capacitance C32, the electrostatic capacitance C33, and the electrostatic capacitance C34, which are connected in parallel. It is hence possible to compensate for a reduction of the electrostatic capacitance, which is caused if the first inner conductor layer 312 and the second inner conductor layer 313 are positioned on the same plane with application of the same polarity and the third inner conductor layer 314 and the fourth inner conductor layer 315 are positioned on the same plane with application of the same polarity, by the presence of the electrostatic capacitance C33 and the electrostatic capacitance C34, and to certainly provide the laminated capacitor 300 with sufficient electrostatic capacitance suitably used for decoupling.

Moreover, since the margin portion of the dielectric chip 301 is set to have a thickness of 30-70 μm at least on the side facing a substrate when the dielectric chip 301 is mounted to the substrate, respective paths extending from the lead-out portions of the inner conductor layers to corresponding substrate electrodes through the outer electrodes are minimized and inductances caused by those paths are also reduced to a minimum, thus resulting in lower ESL. If the thickness of the margin portion is set to be smaller than 30 μm, there arises a risk that the strength of the margin portion is reduced and cracks, etc. may occur. If the thickness of the margin portion is set to be larger than 70 μm, the above-described action of reducing the inductance is difficult to obtain.

In addition, by setting the width of each of the lead-out portions 312a-315a, 312b and 313b of the first to fourth inner conductor layers 312-315 to be not smaller than the length thereof, currents more easily flow through the first to fourth inner conductor layers 312-315, whereby the self-inductance of the laminated capacitor 300 can be reduced correspondingly. With a reduction of the self-inductance, the ESL of the laminated capacitor 300 can be further reduced.

FIGS. 17-21 show a fourth embodiment of the present invention (i.e., a laminated capacitor in still another exemplary form).

Figure 17:
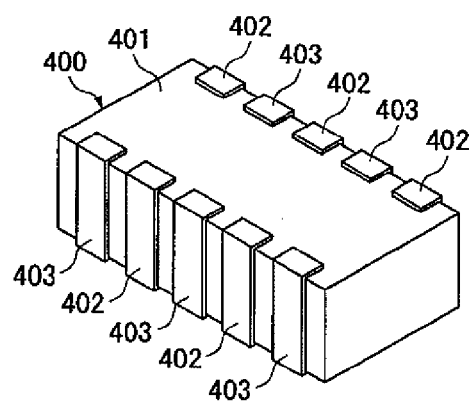
FIG. 17 is a perspective view of a laminated capacitor according to a fourth embodiment of the present invention.

A laminated capacitor 400 shown in FIG. 17 comprises a parallelepiped dielectric chip 401 having a predetermined length, width and height, a total of ten outer electrodes 402 and 403 arranged such that five outer electrodes are disposed on each of opposite side surfaces of the dielectric chip 401 in the direction of width thereof at equal intervals. The total of ten outer electrodes 402 and 403 are alternately supplied with different polarities. Herein, the outer electrodes 402 supplied with one polarity are referred to as first outer electrodes 402, and the outer electrodes 403 supplied with the other polarity are referred to as second outer electrodes 403.

Figure 18:
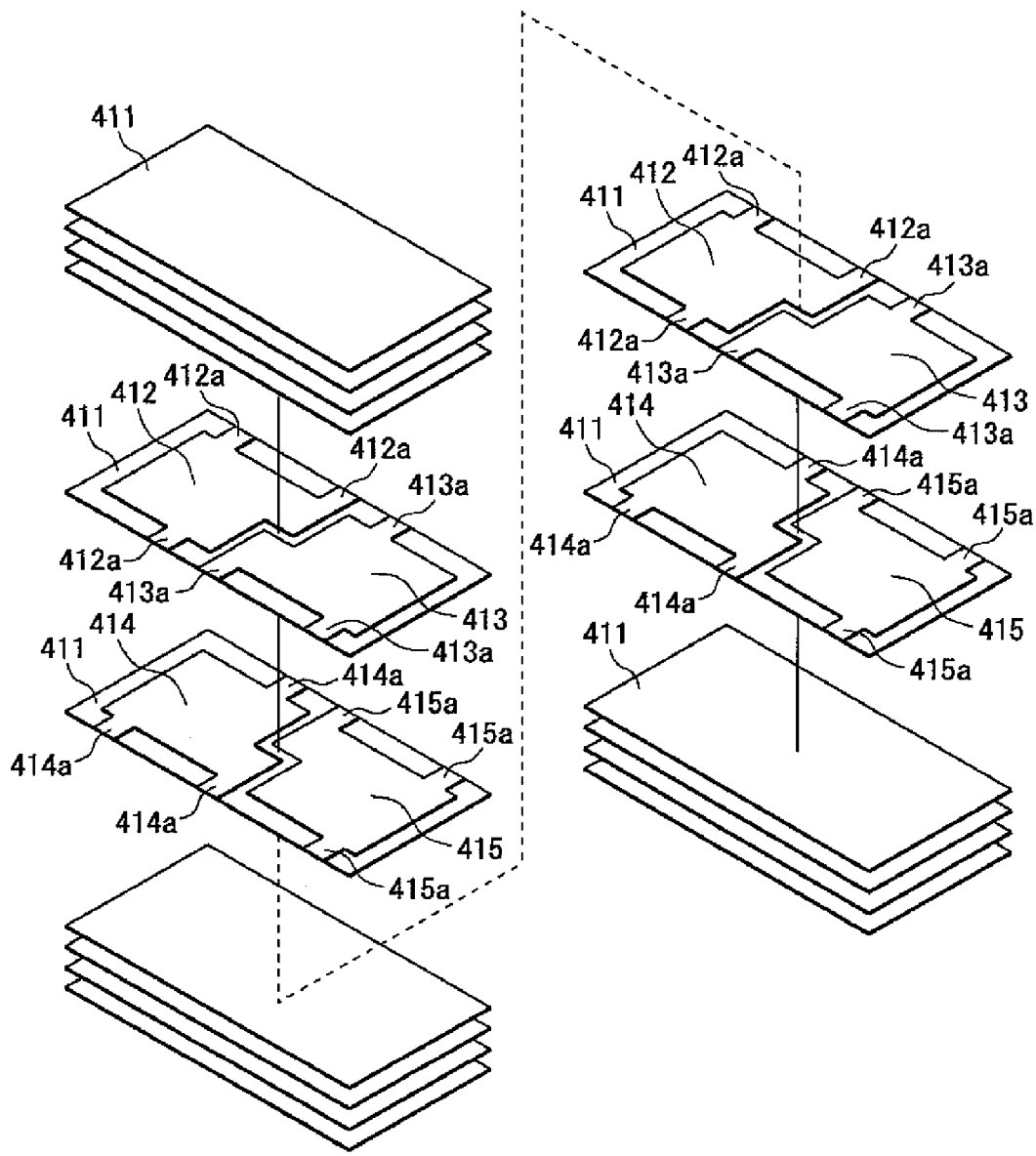
FIG. 18 is an exploded perspective view showing a layered structure of the laminated capacitor shown in FIG. 17.

As shown in FIG. 18, the dielectric chip 401 has an integral structure formed by alternately laminating, in the direction of height, a pair of first inner conductor layer 412 and second inner conductor layer 413 which are positioned on the same plane and are held in a non-contact relation with a bent strip-like clearance interposed between them, and a pair of third inner conductor layer 414 and fourth inner conductor layer 415 which are positioned on the same plane and are held in a non-contact relation with a bent strip-like clearance interposed between them, while a dielectric layer 411 is interposed between the pair of first and second inner conductor layers and the pair of third and fourth inner conductor layers. In other words, the first inner conductor layer 412 and the second inner conductor layer 413 are present in a non-contact state at a predetermined laminate layer interface of the dielectric chip 401, and the third inner conductor layer 414 and the fourth inner conductor layer 415 are present in a non-contact state at another predetermined laminate layer interface of the dielectric chip 401, the latter interface differing from the former interface for the first inner conductor layer 412 and the second inner conductor layer 413.

The first to fourth inner conductor layers 412-415 have basically the same shape, though arranged in different orientations, except for their lead-out portions. The clearance between the first inner conductor layer 412 and the second inner conductor layer 413 is positioned to be partially matched with the clearance between the third inner conductor layer 414 and the second inner conductor layer 415 in the direction of height. Therefore, respective most areas of the first inner conductor layer 412 and the third inner conductor layer 414 face each other in the direction of height with the dielectric layer 411 interposed therebetween, and respective most areas of the second inner conductor layer 413 and the fourth inner conductor layer 415 face each other in the direction of height with the dielectric layer 411 interposed therebetween. In order to positively develop electrostatic capacitance C43 and electrostatic capacitance C44 described later, the clearance between the first inner conductor layer 412 and the second inner conductor layer 413 and the clearance between the third inner conductor layer 414 and the fourth inner conductor layer 415 are each preferably as small as possible.

Incidentally, the first inner conductor layer 412 and the second inner conductor layer 413 are not always required to be in the same number as the third inner conductor layer 414 and the fourth inner conductor layer 415. The number of the inner conductor layers in one pairs may be larger than the number of the inner conductor layers in the other pairs by one.

Further, at each of opposite sides of the dielectric chip 401 in the direction of height, there is a portion (margin portion) in which only the dielectric layers 411 are laminated. The margin portion is set to have a thickness of 30-70 μm at least on the side facing a substrate when the dielectric chip 401 is mounted to the substrate.

Each first inner conductor layer 412 is formed in a partially protruded rectangular shape. The first inner conductor layer 412 has an outer electrode-adapted lead-out portion 412a at one side edge (right side in FIG. 18) thereof in the direction of width on one side (left side in FIG. 18) thereof in the direction of length, which corresponds to the first outer electrode 402 located at a leftmost position on one side surface (right side in FIG. 17) of the dielectric chip 401 in the direction of width and which is connected to the relevant first outer electrode 402, an outer electrode-adapted lead-out portion 412a at the one side edge (right side in FIG. 18) thereof in the direction of width on the other side (right side in FIG. 18) thereof in the direction of length, which corresponds to the first outer electrode 402 located at a third leftmost position on the one side surface (right side in FIG. 17) of the dielectric chip 401 in the direction of width and which is connected to the relevant first outer electrode 402, and an outer electrode-adapted lead-out portion 412a at the other side edge (left side in FIG. 18) thereof in the direction of width on the other side (right side in FIG. 18) thereof in the direction of length, which corresponds to the first outer electrode 402 located at a second leftmost position on the other side surface (left side in FIG. 17) of the dielectric chip 401 in the direction of width and which is connected to the relevant first outer electrode 402. In other words, each first inner conductor layer 412 is supplied with the same polarity as that of the first outer electrodes 402 through the three lead-out portions 412a.

Each second inner conductor layer 413 is formed in a partially protruded rectangular shape. The second inner conductor layer 413 has an outer electrode-adapted lead-out portion 413a at one side edge (right side in FIG. 18) thereof in the direction of width on one side (left side in FIG. 18) thereof in the direction of length, which corresponds to the second outer electrode 403 located at a second rightmost position on the one side surface (right side in FIG. 17) of the dielectric chip 401 in the direction of width and which is connected to the relevant second outer electrode 403, an outer electrode-adapted lead-out portion 413a at the other side edge (left side in FIG. 18) thereof in the direction of width on one side (left side in FIG. 18) thereof in the direction of length, which corresponds to the second outer electrode 403 located at a third leftmost position on the other side surface (left side in FIG. 17) of the dielectric chip 401 in the direction of width and which is connected to the relevant second outer electrode 403, and an outer electrode-adapted lead-out portion 413a at the other side edge (left side in FIG. 18) thereof in the direction of width on the other side (right side in FIG. 18) thereof in the direction of length, which corresponds to the second outer electrode 403 located at a rightmost position on the other side surface (left side in FIG. 17) of the dielectric chip 401 in the direction of width and which is connected to the relevant second outer electrode 403. In other words, each second inner conductor layer 413 is supplied with the same polarity as that of the second outer electrodes 403 through the three lead-out portions 413a.

Each third inner conductor layer 414 is formed in a partially protruded rectangular shape. The third inner conductor layer 414 has an outer electrode-adapted lead-out portion 414a at one side edge (right side in FIG. 18) thereof in the direction of width on the other side (right side in FIG. 18) thereof in the direction of length, which corresponds to the second outer electrode 403 located at a second leftmost position on the one side surface (right side in FIG. 17) of the dielectric chip 401 in the direction of width and which is connected to the relevant second outer electrode 403, an outer electrode-adapted lead-out portion 414a at the other side edge (left side in FIG. 18) thereof in the direction of width on one side (left side in FIG. 18) thereof in the direction of length, which corresponds to the second outer electrode 403 located at a leftmost position on the other side surface (left side in FIG. 17) of the dielectric chip 401 in the direction of width and which is connected to the relevant second outer electrode 403, and an outer electrode-adapted lead-out portion 414a at the other side edge (left side in FIG. 18) thereof in the direction of width on the other side (right side in FIG. 18) thereof in the direction of length, which corresponds to the second outer electrode 403 located at a third leftmost position on the other side surface (left side in FIG. 17) of the dielectric chip 401 in the direction of width and which is connected to the relevant second outer electrode 403. In other words, each third inner conductor layer 414 is supplied with the same polarity as that of the second outer electrodes 403 through the three lead-out portions 414a.

Each fourth inner conductor layer 415 is formed in a partially protruded rectangular shape. The fourth inner conductor layer 415 has an outer electrode-adapted lead-out portion 415a at one side edge (right side in FIG. 18) thereof in the direction of width on one side (left side in FIG. 18) thereof in the direction of length, which corresponds to the first outer electrode 402 located at a third leftmost position on the one side surface (right side in FIG. 17) of the dielectric chip 401 in the direction of width and which is connected to the relevant first outer electrode 402, an outer electrode-adapted lead-out portion 415a at the one side edge (right side in FIG. 18) thereof in the direction of width on the other side (right side in FIG. 18) thereof in the direction of length, which corresponds to the first outer electrode 402 located at a rightmost position on the one side surface (right side in FIG. 17) of the dielectric chip 401 in the direction of width and which is connected to the relevant first outer electrode 402, and an outer electrode-adapted lead-out portion 415a at the other side edge (left side in FIG. 18) thereof in the direction of width on the other side (right side in FIG. 18) thereof in the direction of length, which corresponds to the first outer electrode 402 located at a rightmost position on the other side surface (left side in FIG. 17) of the dielectric chip 401 in the direction of width and which is connected to the relevant first outer electrode 402. In other words, each fourth inner conductor layer 415 is supplied with the same polarity as that of the first outer electrodes 402 through the three lead-out portions 415a.

Figure 19:
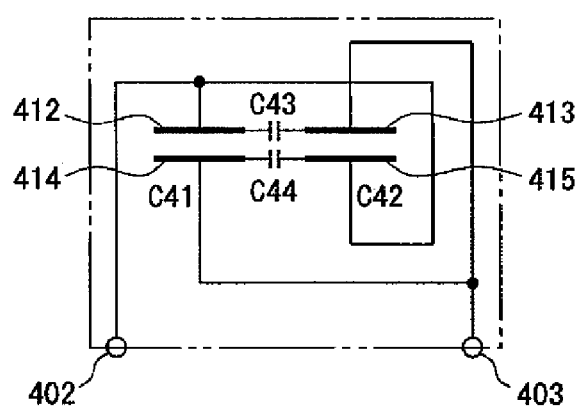
FIG. 19 is a diagram showing an equivalent circuit of the laminated capacitor shown in FIG. 17.

As seen from an equivalent circuit of FIG. 19, in the laminated capacitor 400 shown in FIG. 17, predetermined electrostatic capacitance C41 is formed by the first inner conductor layer 412 and the third inner conductor layer 414 which is positioned to face the first inner conductor layer 412 with the dielectric layer 411 interposed between them, and predetermined electrostatic capacitance C42 is formed by the second inner conductor layer 413 and the fourth inner conductor layer 415 which is positioned to face the second inner conductor layer 413 with the dielectric layer 411 interposed between them. Also, predetermined electrostatic capacitance C43 is formed between the first inner conductor layer 412 and the second inner conductor layer 413 which are positioned on the same plane and have different polarities, and predetermined electrostatic capacitance C44 is formed between the third inner conductor layer 414 and the fourth inner conductor layer 415 which are positioned on the same plane and have different polarities. Accordingly, electrostatic capacitance of the laminated capacitor 400 obtained through the five first outer electrodes 402 and the five second outer electrodes 403 is given by a resultant value of the electrostatic capacitance C41 the electrostatic capacitance C42, the electrostatic capacitance C43, and the electrostatic capacitance C44, which are connected in parallel.

The laminated capacitor 400 shown in FIG. 17 is used in a state where one polarity is applied to the five first outer electrodes 402 and the other polarity is applied to the five second outer electrode 403.

Figure 20:
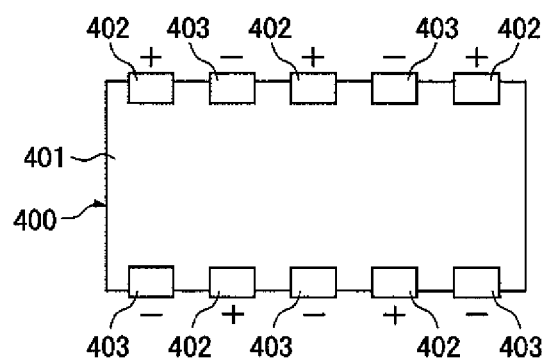
FIG. 20 is a diagram showing polarities when five first outer electrodes of the laminated capacitor shown in FIG. 17 are set to be plus and five second outer electrodes thereof are set to be minus (grounded)
Figure 21:
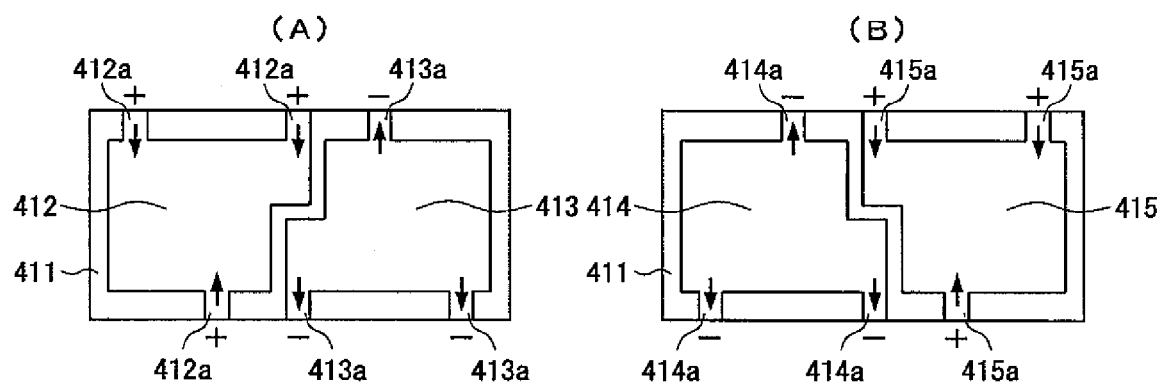
FIGS. 21A and 21B are diagrams showing directions of current flows in first to fourth inner conductor layers when the five first outer electrodes of the laminated capacitor shown in FIG. 17 are set to be plus and the five second outer electrodes thereof are set to be minus (grounded).

For example, when the five first outer electrodes 402 are set to be plus and the five second outer electrodes 403 are set to be minus (grounded) as shown in FIG. 20, currents flow in opposed directions respectively through the lead-out portions 412a of the first inner conductor layer 412 and the lead-out portions 413a of the second inner conductor layer 413 which is positioned on the same plane as the first inner conductor layer 412 and which differs in polarity from it, as indicated by arrows in FIG. 21A. Corresponding to those current flows, currents in opposed directions also flow respectively through the first inner conductor layer 412 and the second inner conductor layer 413. Further, as indicated by arrows in FIG. 21B, currents flow in opposed directions respectively through the lead-out portions 414a of the third inner conductor layer 414 and the lead-out portions 415a of the fourth inner conductor layer 415 which is positioned on the same plane as the third inner conductor layer 414 and which differs in polarity from it. Corresponding to those current flows, currents in opposed directions also flow respectively through the third inner conductor layer 414 and the fourth inner conductor layer 415.

In addition, as indicated by the arrows in FIGS. 21A and 21B, currents flow in opposed directions respectively through the lead-out portions 412a of the first inner conductor layer 412 and the lead-out portions 414a of the third inner conductor layer 414 which is positioned to face the first inner conductor layer 412 with the dielectric layer 411 interposed between them and which differs in polarity from it. Corresponding to those current flows, currents in opposed directions also flow respectively through the first inner conductor layer 412 and the third inner conductor layer 414. Further, as indicated by the arrows in FIGS. 21A and 21B, currents flow in opposed directions respectively through the lead-out portions 413a of the second inner conductor layer 413 and the lead-out portions 415a of the fourth inner conductor layer 415 which is positioned to face the second inner conductor layer 413 with the dielectric layer 411 interposed between them and which differs in polarity from it. Corresponding to those current flows, currents in opposed directions also flow respectively through the second inner conductor layer 413 and the fourth inner conductor layer 415.

As a matter of course, when the five first outer electrodes 402 are set to be minus (grounded) and the five second outer electrodes 403 are set to be plus, the directions of currents flowing through the respective lead-out portions of the inner conductor layers and the inner conductor layers themselves are reversed from the above-described directions.

Thus, because the above-described current flows are obtained in the state where one polarity is applied to the five first outer electrodes 402 and the other polarity is applied to the five second outer electrode 403, the ESL (Equivalent Series Inductance) of the laminated capacitor 400 can be effectively reduced based on similar magnetic field canceling actions (magnetic flux counteracting actions) to those of above (1)-(4) described in the first embodiment.

In particular, the magnetic field canceling actions (magnetic flux counteracting actions) of above (1) and (2) can be reliably and properly obtained by positioning, on the same plane, the first inner conductor layer 412 and the second inner conductor layer 413 which differ in polarity from each other, and by positioning, on the same plane, the third inner conductor layer 414 and the fourth inner conductor layer 415 which differ in polarity from each other.

Also, as a result of increasing the number of the lead-out portions 412a-415a of the first to fourth inner conductor layers 412-415, currents more easily flow through the first to fourth inner conductor layers 412-415, whereby the self-inductance of the laminated capacitor 400 can be reduced correspondingly. With a reduction of the self-inductance, the ESL of the laminated capacitor 400 can be further reduced.

Further, the predetermined electrostatic capacitance C41 can be formed by the first inner conductor layer 412 and the third inner conductor layer 414 which is positioned to face the first inner conductor layer 412 with the dielectric layer 411 interposed between them, and the predetermined electrostatic capacitance C42 can be formed by the second inner conductor layer 413 and the fourth inner conductor layer 415 which is positioned to face the second inner conductor layer 413 with the dielectric layer 411 interposed between them. Also, the predetermined electrostatic capacitance C43 can be formed between the first inner conductor layer 412 and the second inner conductor layer 413 which are positioned on the same plane and have different polarities, and the predetermined electrostatic capacitance C44 can be formed between the third inner conductor layer 414 and the fourth inner conductor layer 415 which are positioned on the same plane and have different polarities. Therefore, the electrostatic capacitance of the laminated capacitor 400 obtained through the five first outer electrodes 402 and the five second outer electrodes 403 can be given by the resultant value of four electrostatic capacitances, i.e., the electrostatic capacitance C41, the electrostatic capacitance C42, the electrostatic capacitance C43, and the electrostatic capacitance C44, which are connected in parallel. It is hence possible to compensate for a reduction of the electrostatic capacitance, which is caused if the first inner conductor layer 412 and the second inner conductor layer 413 are positioned on the same plane with application of the same polarity and the third inner conductor layer 414 and the fourth inner conductor layer 415 are positioned on the same plane with application of the same polarity, by the presence of the electrostatic capacitance C43 and the electrostatic capacitance C44, and to certainly provide the laminated capacitor 400 with sufficient electrostatic capacitance suitably used for decoupling.

Moreover, since the margin portion of the dielectric chip 401 is set to have a thickness of approximately 30-70 µm at least on the side facing a substrate when the dielectric chip 401 is mounted to the substrate, respective paths extending from the lead-out portions of the inner conductor layers to corresponding substrate electrodes through the outer electrodes are minimized and inductances caused by those paths are also reduced to a minimum, thus resulting in lower ESL. If the thickness of the margin portion is set to be smaller than 30 µm, there arises a risk that the strength of the margin portion is reduced and cracks, etc. may occur. If the thickness of the margin portion is set to be larger than 70 µm, the above-described action of reducing the inductance is difficult to obtain.

In addition, by setting the width of each of the lead-out portions 412a-415a of the first to fourth inner conductor layers 412-415 to be not smaller than the length thereof, currents more easily flow through the first to fourth inner conductor layers 412-415, whereby the self-inductance of the laminated capacitor 400 can be reduced correspondingly. With a reduction of the self-inductance, the ESL of the laminated capacitor 400 can be further reduced.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A laminated capacitor comprising a parallelepiped dielectric chip, and eight or more outer electrodes disposed on opposite sides of the dielectric chip and alternately supplied with different polarities, wherein the dielectric chip is formed by alternately laminating a pair of first inner conductor layer and second inner conductor layer which are positioned on the same plane and are held in a non-contact relation, and a pair of third inner conductor layer and fourth inner conductor layer which are positioned on the same plane and are held in a non-contact relation, while a dielectric layer is interposed between the pair of first and second inner conductor layers and the pair of third and fourth inner conductor layers, the first inner conductor layer and the third inner conductor layer are positioned to face each other with the dielectric layer interposed therebetween, and the second inner conductor layer and the fourth inner conductor layer are positioned to face each other with the dielectric layer interposed therebetween, the first inner conductor layer has at least two outer electrode-adapted lead-out portions which are disposed at side edges thereof and are connected respectively to the outer electrodes supplied with a first polarity, the second inner conductor layer has at least two outer electrode-adapted lead-out portions which are disposed at side edges thereof and are connected respectively to the outer electrodes supplied with a second polarity, the third inner conductor layer has at least two outer electrode-adapted lead-out portions which are disposed at side edges thereof and are connected respectively to the outer electrodes supplied with the second polarity, and the fourth inner conductor layer has at least two outer electrode-adapted lead-out portions which are disposed at side edges thereof and are connected respectively to the outer electrodes supplied with the first polarity, wherein at least four of the outer electrodes are disposed on one of the opposite sides of the dielectric chip and the remaining at least four of the outer electrodes are disposed on the other of the opposite side surfaces of the dielectric chip, at least one of the outer electrode-adapted lead-out portions of the first inner conductor layer is disposed at one of opposite side edges of the first inner conductor layer and remaining at least one thereof is disposed at the other of the opposite side edges of the first inner conductor layer, at least one of the outer electrode-adapted lead-out portions of the second inner conductor layer is disposed at one of opposite side edges of the second inner conductor layer and remaining at least one thereof is disposed at the other of the opposite side edges of the second inner conductor layer, at least one of the outer electrode-adapted lead-out portions of the third inner conductor layer is disposed at one of opposite side edges of the third inner conductor layer and remaining at least one thereof is disposed at the other of the opposite side edges of the third inner conductor layer, and at least one of the outer electrode-adapted lead-out portions of the fourth inner conductor layer is disposed at one of opposite side edges of the fourth inner conductor layer and remaining at least one thereof is disposed at the other of the opposite side edges of the fourth inner conductor layer.

2. The laminated capacitor according to claim 1, wherein the dielectric chip has one or more dielectric layers of a thickness of approximately 30-70 μm on the side facing a substrate when the dielectric chip is mounted to the substrate.

3. The laminated capacitor according to claim 1, wherein the width of each outer electrode-adapted lead-out portion is not smaller than the length thereof.

4. A capacitor comprising:

a first conductor layer comprising a first region and a second region which are positioned on the plane of the first conductor layer and separated from each other;

a second conductor layer comprising a third region and a fourth region which are positioned on the plane of the second conductor layer and separated from each other;

wherein the first layer and the second layer are alternatively laminated with a dielectric layer interposed between the first and second layer, and each of the regions is connected to two of a plurality of outer electrodes, the electrodes being configured to be supplied with one of two polarities, wherein the capacitor is configured such that currents flow in opposite directions in any two regions which are next to each other either within the same conductor layer or within neighboring conductor layers and positioned to face each other, wherein at least one of outer electrode-adapted lead-out portions of the first region is disposed at one of opposite side edges of the first region and remaining at least one thereof is disposed at the other of the opposite side edges of the first region, at least one of outer electrode-adapted lead-out portions of the second region is disposed at one of opposite side edges of the second region and remaining at least one thereof is disposed at the other of the opposite side edges of the second region, at least one of outer electrode-adapted lead-out portions of the third region is disposed at one of opposite side edges of the third region and remaining at least one thereof is disposed at the other of the opposite side edges of the third region, and at least one of outer electrode-adapted lead-out portions of the fourth region is disposed at one of opposite side edges of the fourth region and remaining at least one thereof is disposed at the other of the opposite side edges of the fourth region.

* * * * *